(12) United States Patent
Damon et al.

(10) Patent No.: US 8,910,787 B2
(45) Date of Patent: Dec. 16, 2014

(54) PROTECTIVE CASE FOR PORTABLE ELECTRONIC DEVICE

(75) Inventors: Daniel J. Damon, South Wales, NY (US); Christine A. Drosendahl, East Aurora, NY (US); Anthony Favorito, Buffalo, NY (US); Jared P. Pardi, Cheektowaga, NY (US); John Thaddeus Smokowski, West Seneca, NY (US); Gary E. Weber, Buffalo, NY (US)

(73) Assignee: Mattel, Inc., El Segundo, CA (US)

( * ) Notice: Subject to any disclaimer, the term of this patent is extended or adjusted under 35 U.S.C. 154(b) by 225 days.

(21) Appl. No.: 13/351,811

(22) Filed: Jan. 17, 2012

(65) Prior Publication Data

US 2012/0228181 A1    Sep. 13, 2012

Related U.S. Application Data

(60) Provisional application No. 61/433,662, filed on Jan. 18, 2011.

(51) Int. Cl.
| | | |
|---|---|---|
| *B65D 85/30* | (2006.01) | |
| *B65D 81/02* | (2006.01) | |
| *A45C 13/00* | (2006.01) | |
| *G06F 1/16* | (2006.01) | |
| *A45C 11/00* | (2006.01) | |

(52) U.S. Cl.
CPC .............. *A45C 11/00* (2013.01); *A45C 13/002* (2013.01); *A45C 2011/002* (2013.01); *G06F 2200/1633* (2013.01); *G06F 1/1626* (2013.01); *A45C 2011/001* (2013.01); *A45C 2011/003* (2013.01)
USPC .............................. 206/320; 206/778; 446/75

(58) Field of Classification Search
USPC .......... 206/38, 320, 461–467, 575, 775, 776, 206/778; 248/560, 682; 361/679.56; 446/73, 75, 81, 486
See application file for complete search history.

(56) References Cited

U.S. PATENT DOCUMENTS

| | | | | |
|---|---|---|---|---|
| 3,356,208 | A * | 12/1967 | Kondo ......................... | 206/236 |
| 5,996,749 | A * | 12/1999 | Hillsberg et al. ............. | 206/320 |
| 6,179,122 | B1 * | 1/2001 | Moncrief et al. ............. | 206/320 |
| 6,222,121 | B1 * | 4/2001 | Cheng ........................... | 206/521 |
| 6,234,308 | B1 * | 5/2001 | Saffron et al. ................. | 206/776 |
| 6,646,864 | B2 | 11/2003 | Richardson | |
| 6,719,139 | B1 * | 4/2004 | Foos et al. ..................... | 206/462 |
| 6,741,461 | B1 | 5/2004 | Owoeye | |
| 6,995,976 | B2 | 2/2006 | Richardson | |
| 7,158,376 | B2 * | 1/2007 | Richardson et al. ..... | 361/679.56 |
| 7,312,984 | B2 | 12/2007 | Richardson | |

(Continued)

OTHER PUBLICATIONS

International Search Report from PCT/2012/021536, dated Aug. 31, 2012.

*Primary Examiner* — Luan K Bui
(74) *Attorney, Agent, or Firm* — Edell, Shapiro & Finnan, LLC

(57) ABSTRACT

A protective case for an electronic portable device includes a main body portion having a transparent base and sidewalls defining a recess configured for releasably receiving a portable electronic device. A plate is disposed against or defined by a portion of the base of the main body. The plate covers a portion of the front face or a portion of the display of the portable electronic device. The covered portion of the display is not actuable through the plate.

20 Claims, 10 Drawing Sheets

(56) References Cited

U.S. PATENT DOCUMENTS

| | | |
|---|---|---|
| 7,359,184 B2 | 4/2008 | Lord |
| 7,380,657 B2 | 6/2008 | Yeh |
| D582,894 S | 12/2008 | Richter |
| 7,520,389 B2 * | 4/2009 | Lalouette .................. 206/320 |
| 2003/0111366 A1 | 6/2003 | Enners |
| 2006/0277555 A1 | 12/2006 | Howard |
| 2007/0151899 A1 * | 7/2007 | Chun ........................ 206/775 |
| 2008/0029413 A1 | 2/2008 | Brandenburg |
| 2008/0085025 A1 | 4/2008 | Findley |
| 2008/0157574 A1 | 7/2008 | Larussa |
| 2009/0009945 A1 | 1/2009 | Johnson et al. |
| 2009/0050499 A1 | 2/2009 | Calco |
| 2009/0114556 A1 | 5/2009 | Tai |
| 2009/0203294 A1 | 8/2009 | Kessin |
| 2009/0305601 A1 * | 12/2009 | King ............................ 446/73 |
| 2010/0096963 A1 | 4/2010 | McLaughlin et al. |
| 2012/0091313 A1 * | 4/2012 | Cohn .......................... 248/682 |

* cited by examiner

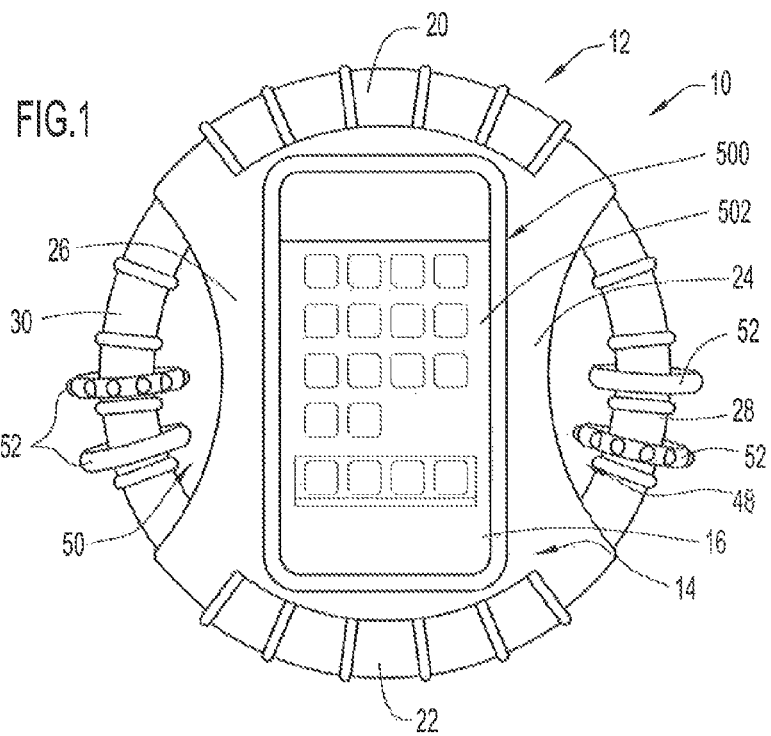
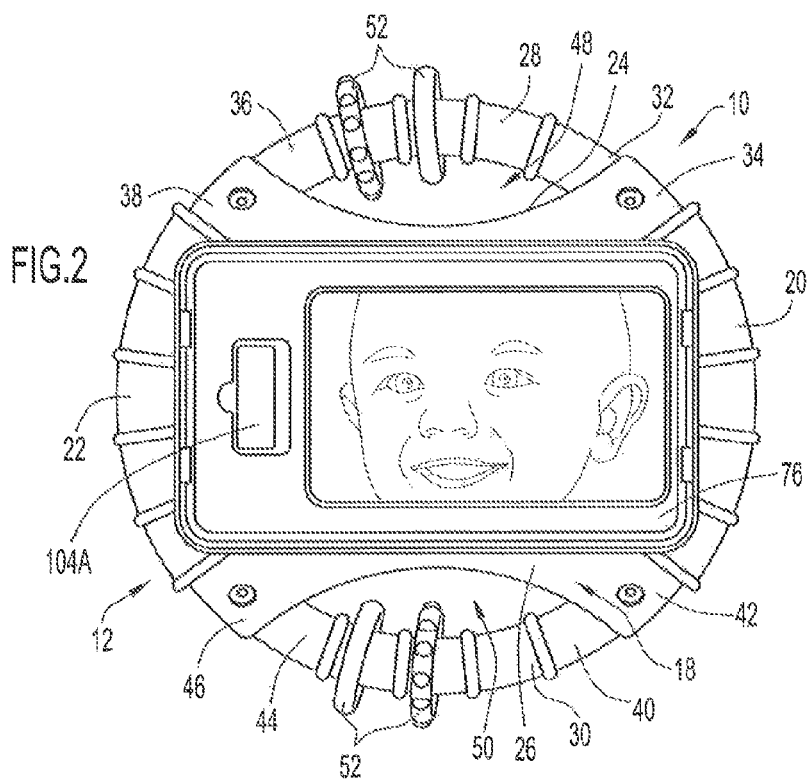

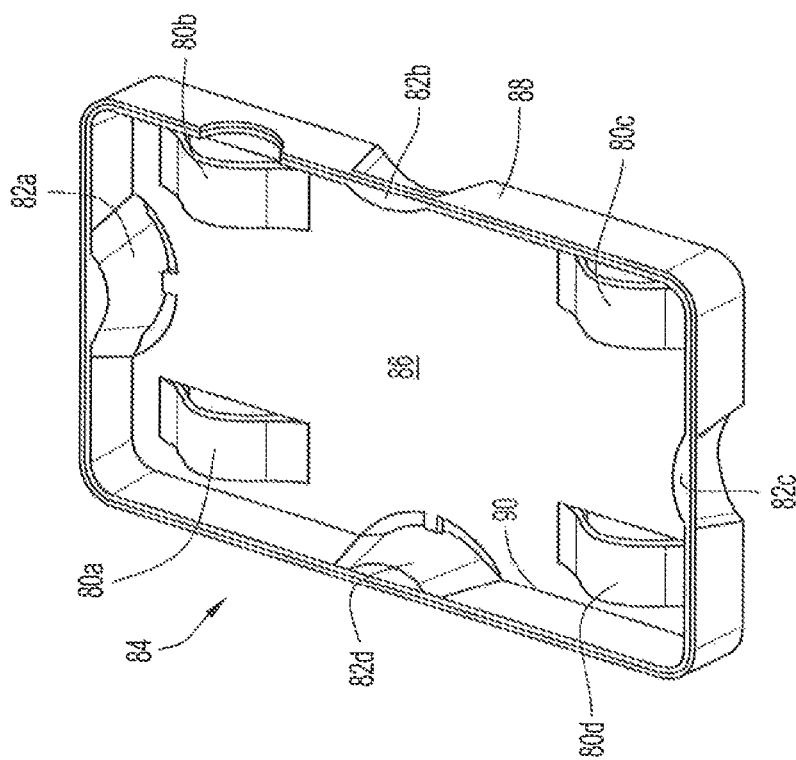
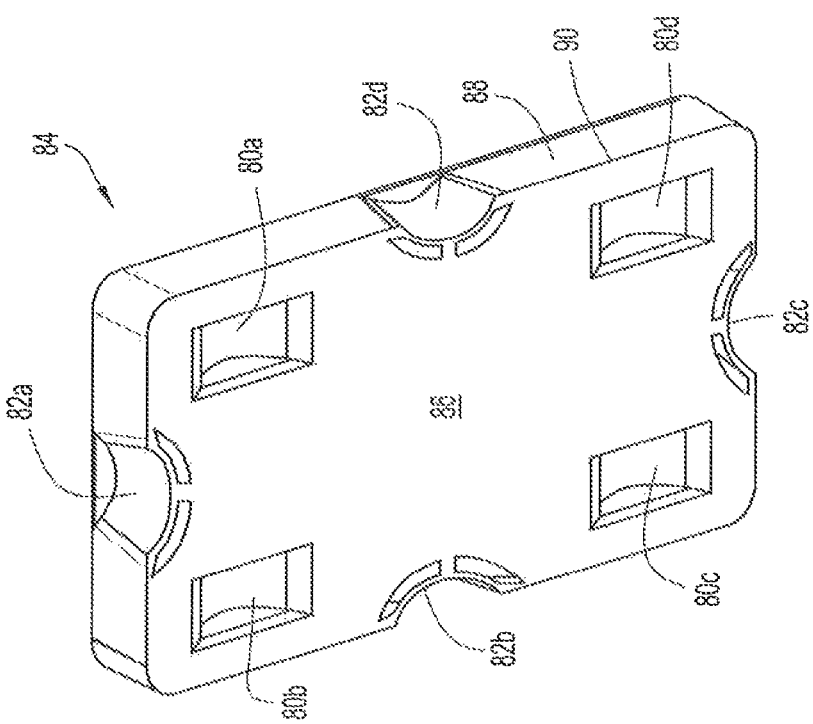

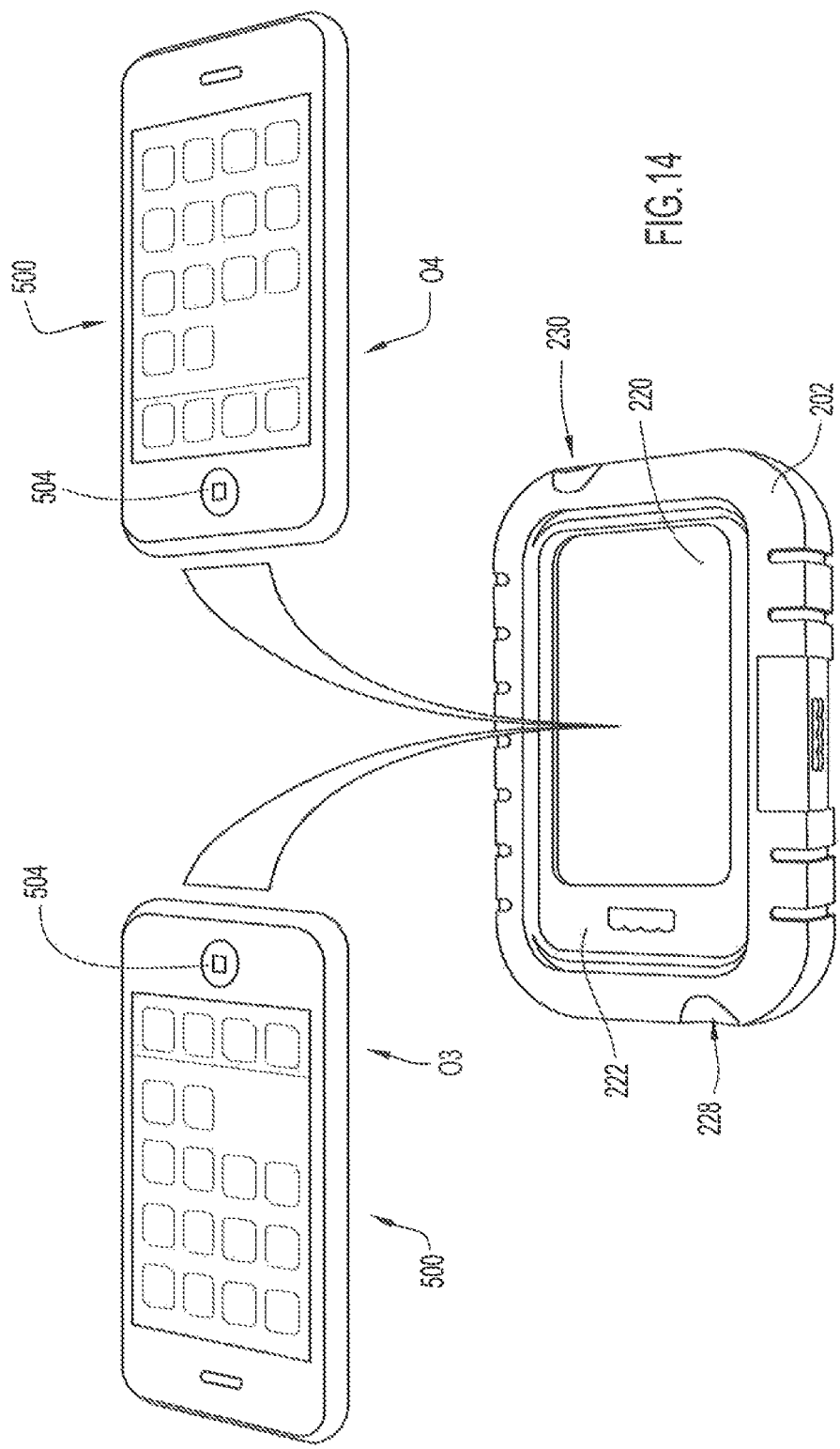

PROTECTIVE CASE FOR PORTABLE ELECTRONIC DEVICE

CROSS-REFERENCE APPLICATIONS

This application claims the benefit of and priority under 35 U.S.C. 119(e) to U.S. Provisional Application No. 61/433,662, entitled "Protective Case for Portable Electronic Device", filed Jan. 18, 2011, the disclosure of which is incorporated herein by reference in its entirety.

FIELD OF THE INVENTION

The present invention relates to a protective case for a portable electronic device, and in particular, a child friendly and "kid-tough" protective case for an electronic device.

BACKGROUND OF THE INVENTION

Various protective covers and sleeves for portable electronic devices, such as cellular phones, media players, and portable computers, are known. Some designs provide additional protection to the device from damage, but do not permit use of the device when disposed in the cover. Other designs permit use of the device when disposed in the cover, but do not sufficiently protect the device from damage, misuse, or unauthorized use when handled by young children or infants.

Therefore, there is a need for a protective case for a portable electronic device that is appropriate for use by infants and young children. In addition, there is a need for a protective case for a portable electronic device that provides auxiliary features for entertaining an infant or child.

SUMMARY OF THE INVENTION

The present invention is directed to a child-friendly and kid-tough case for receiving a portable electronic device, including, but not limited to an iPhone® or an iPod Touch® device. In some embodiments, in addition to holding the hand-held electronic device, the protective case also includes child or infant appropriate mechanical activities, such as clacker beads, around its perimeter.

The front of the case includes a semi-rigid thin film protective cover for the screen of the electronic device. This film is thin enough so that the touch sensitive features of the electronic device may be activated through the film. The front of the case also includes a more rigid plate, band, or thickened portion that covers a portion of the front of the device or a portion of the display screen of the device (e.g., the "Home" button on the electronic device). The rigid band does not permit activation by the user of any actuators on the covered portion of the front of the device (e.g., the "Home" button). The hand-held electronic device may be placed in a first position within the case so that the portion of the front of the device or a portion of the display screen is covered by the rigid band and not actuable, or the device may be rotated 180° so that the originally covered portion of the front of the device or a portion of the display screen is visible and actuable through the thin film protective cover.

In one embodiment, a protective case for a portable electronic device includes a tray having a base and a sidewall defining a first recess configured for receiving the portable electronic device. A main body has a base and sidewalls defining a second recess configured for receiving the tray. The base of the main body includes a transparent planar portion. The portable electronic device is disposable between the base of the tray and the transparent planar portion of the main body so that at least a portion of a display of the portable electronic device is visible through the transparent planar portion.

In one embodiment, the protective case includes a resilient member extending outwardly from and coupled to the base of the tray. The resilient member is compressible against the portable electronic device so that the portable electronic device is biased away from the base of the tray and toward the transparent planar portion. Alternatively or in addition, the case may include a resilient member extending outwardly from and coupled to the sidewall of the tray, which is compressible against the portable electronic device so that the portable electronic device is biased away from the sidewall of the tray.

In one embodiment, the case includes a plate disposed against or defined by a portion of the base of the main body. The plate covers a portion of the front of the device or a portion of the display of the portable electronic device. In one implementation, the portable electronic device is disposable between the base of the tray and the transparent planar portion in a first orientation so that the portion of the front of the device or a portion of the display screen is covered by the plate and not actuable. The device is also disposable between the base of the tray and the transparent planar portion in a second orientation wherein the originally covered portion of the front of the device or a portion of the display screen is visible and actuable through the transparent planar portion.

In one embodiment, the protective case includes handles extending outwardly from and coupled to the main body. Each of the handles may have a generally arcuate configuration. In one implementation, one or more entertainment elements are coupled to one or both of the handles. For example, the entertainment element may include a plurality of rings or beads movable along the corresponding handles.

In one embodiment, an entertainment element is coupled to an outer surface of the base of the tray. In one implementation, the entertainment element is a mirror. In one embodiment, the tray includes a latch mechanism releasably lockable to a receiving portion of the main body, so that the tray is releasably lockable to the main body.

In one embodiment, the protective case includes an overmold portion coupled to the tray and substantially lining the first recess. The overmold portion includes a plurality of outwardly extending compressible ribs configured to bias the portable electronic device away from the base and the sidewall of the tray.

The present invention is also directed to a protective case for a portable electronic device, including a main body portion and a handle. The main body portion includes a base and sidewalls defining a first recess configured for releasably receiving a portable electronic device. The handle is coupled to and extending outwardly from the main body.

In one embodiment, the case also includes a tray having a base and a sidewall defining a recess configured for receiving the portable electronic device. The tray is receivable in the recess so that the portable electronic device is disposable between the base of the main body and the base of the tray.

In one embodiment, the handle is a first handle coupled to a first side of the main body. The case also includes a second handle coupled to and extending outwardly from a second side of the main body. In one implementation, the first and second handles have a generally circular configuration in plan view.

In one embodiment, the case includes at least one entertainment element coupled to the handle. The entertainment element(s) is movable along the handle between opposing end portions thereof.

In one embodiment, the base of the main body includes a transparent planar portion. At least a portion of the front of the portable electronic device or a portion of a touch screen of the portable electronic device is disposed against and actuable through the transparent planar portion when the portable electronic device is disposed in the first recess.

BRIEF DESCRIPTION OF THE DRAWINGS

FIG. 1 illustrates a front perspective view of a protective case for a portable electronic device according to an embodiment of the present invention;

FIG. 2 illustrates a rear perspective view of the case of FIG. 1;

FIG. 7 illustrates a rear perspective view of an overmold portion of the tray of FIG. 3;

FIG. 8 illustrates a front perspective view of the overmold portion of FIG. 7;

FIG. 14 illustrates a perspective view of the protective case of FIG. 12 showing an exemplary portable electronic device receivable in the case in a first orientation, and an exemplary portable electronic device receivable in the case in a second orientation.

Like reference numerals have been used to identify like elements throughout this disclosure.

DETAILED DESCRIPTION OF THE INVENTION

Figure 3:
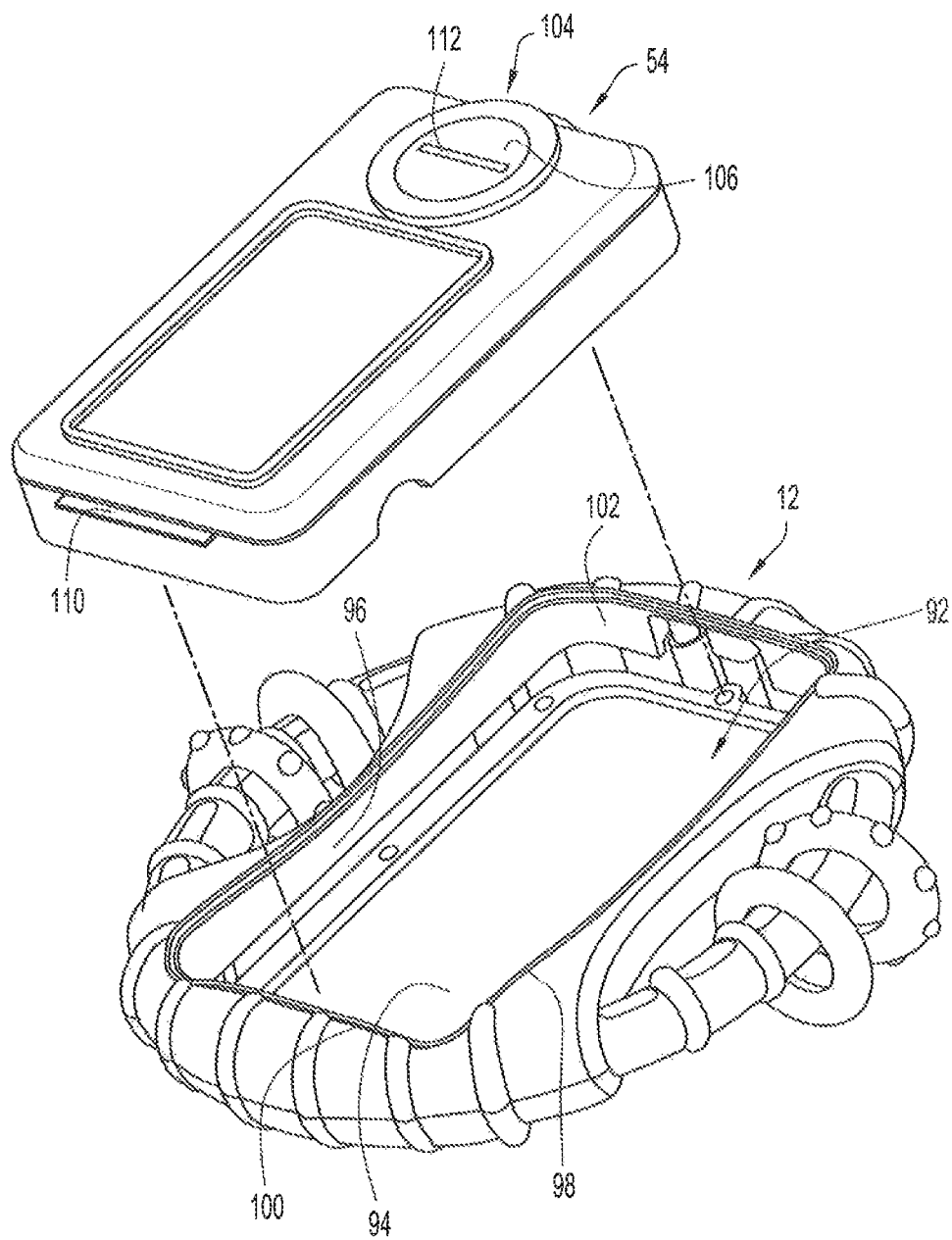
FIG. 3 illustrates a perspective assembly view of a tray in accordance with the present invention and a main body of the case of FIG. 1.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as may be described herein, and do not limit the present invention to any particular configuration or orientation.

FIGS. 1 and 2 illustrate a protective case 10 for a portable electronic device 500 according to an embodiment of the present invention. The case 10 includes a main body 12 having a front surface 14 including a transparent planar portion 16 through which a portion of a display 502 of the electronic device 500 is visible (shown in FIG. 1), and a rear surface 18 (shown in FIG. 2).

The main body 12 includes opposing end portions 20, 22 and opposing side portions 24, 26. The main body 12 may be formed from a relatively rigid material, such as a polymer material. For example, the main body 12 may be formed from acrylonitrile butadiene styrene (ABS). Each of the end portions 20, 22 has an arcuate and generally convex configuration, and is configured to enhance gripping of the end portions 20, 22 by a user. For example, each end portion 20, 22 may include a plurality of knurls, ridges, or a textured surface for ease of gripping the case 10 by a user. In one embodiment, each of the end portions 20, 22 of the main body 12 include an overmold formed from a thermoplastic material. For example, a material such as polyvinyl chloride (PVC), which includes the ridged surface, may be used for enhanced grippability.

Each of the side portions 24, 26 has an arcuate and generally convex configuration. A handle 28 is coupled to and extends outwardly from the side portion 24, and another handle 30 is coupled to extends outwardly from the other side portion 26. Referring to FIG. 2, the handle 28 includes an end 32 coupled to and extending from a corner portion 34 of the end portion 20, and another opposite end 36 coupled to and extending from a corner portion 38 of the other end portion 22. Similarly, the other handle 30 includes an end 40 coupled to and extending from a corner portion 42 of the end portion 20, and another opposite end 44 coupled to and extending from a corner portion 46 of the other end portion 22.

Each of the handles 28, 30 has an arcuate and generally convex configuration. Similar to the end portions 20, 22, the handles 28, 30 may include a plurality of knurls, ridges, or a textured surface for ease of gripping. The handles 28, 30 may also be formed from a thermoplastic material, such as PVC. An opening 48 is defined by the handle 28 and the side portion 24 of the main body 12, and another opening 50 is defined by the other handle 30 and the side portion 26 of the main body 12. In one implementation, the perimeter of the handles 28, 30 and adjoining end portions 20, 22 is generally circular in plan view. Thus, the protective case 10 may be configured to generally resemble a steering wheel.

With continued reference to FIGS. 1 and 2, one or more entertainment elements may be coupled to one or both of the handles 28, 30. In one embodiment, clacker beads 52 or rings are coupled to each of the handles 28, 30. The beads 52 (or other entertainment elements) are movable along their corresponding handles 28, 30 and between opposing ends 32, 36 and/or 40, 44 thereof. The protective case 10 may also include additional or alternative entertainment elements.

Figure 4:
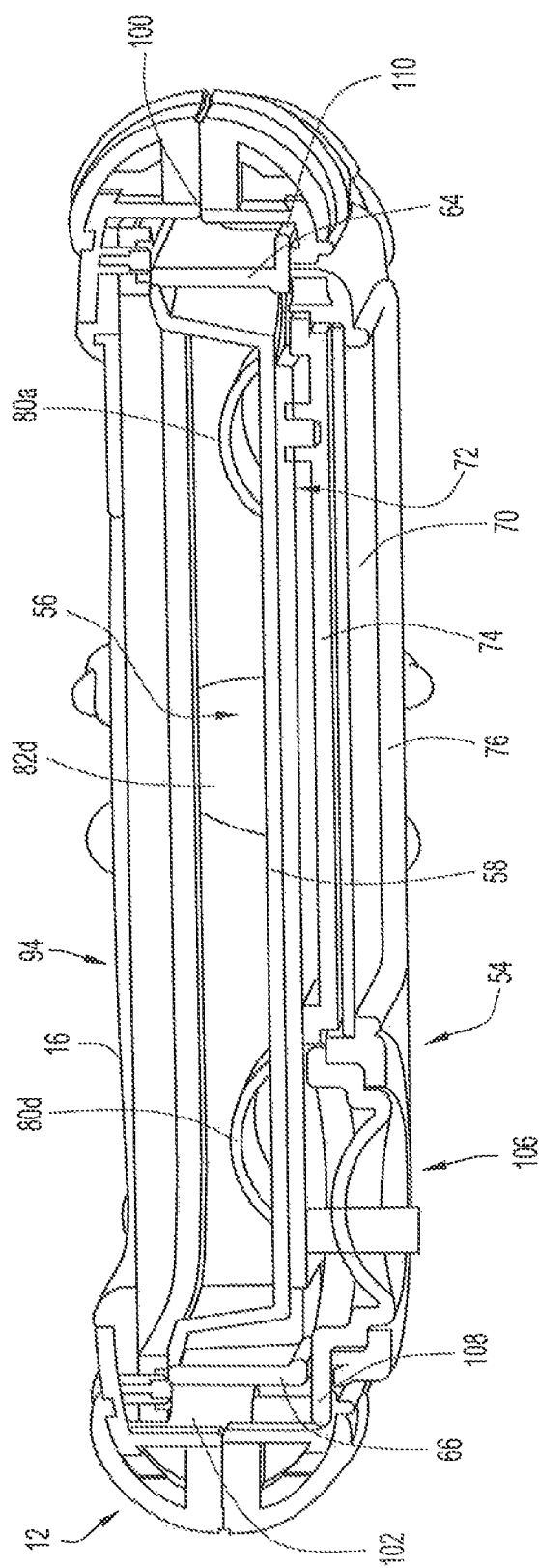
FIG. 4 illustrates a sectional view of the case of FIG. 3.

Referring to FIGS. 3 and 4, the case 10 also includes a tray 54 configured for receiving the electronic device 500. The main body 12 is configured for receiving the tray 54, so that the electronic device 500 is disposed within a cavity 56 (shown in FIG. 4) defined by the tray 54 and the main body 12.

Figure 5:
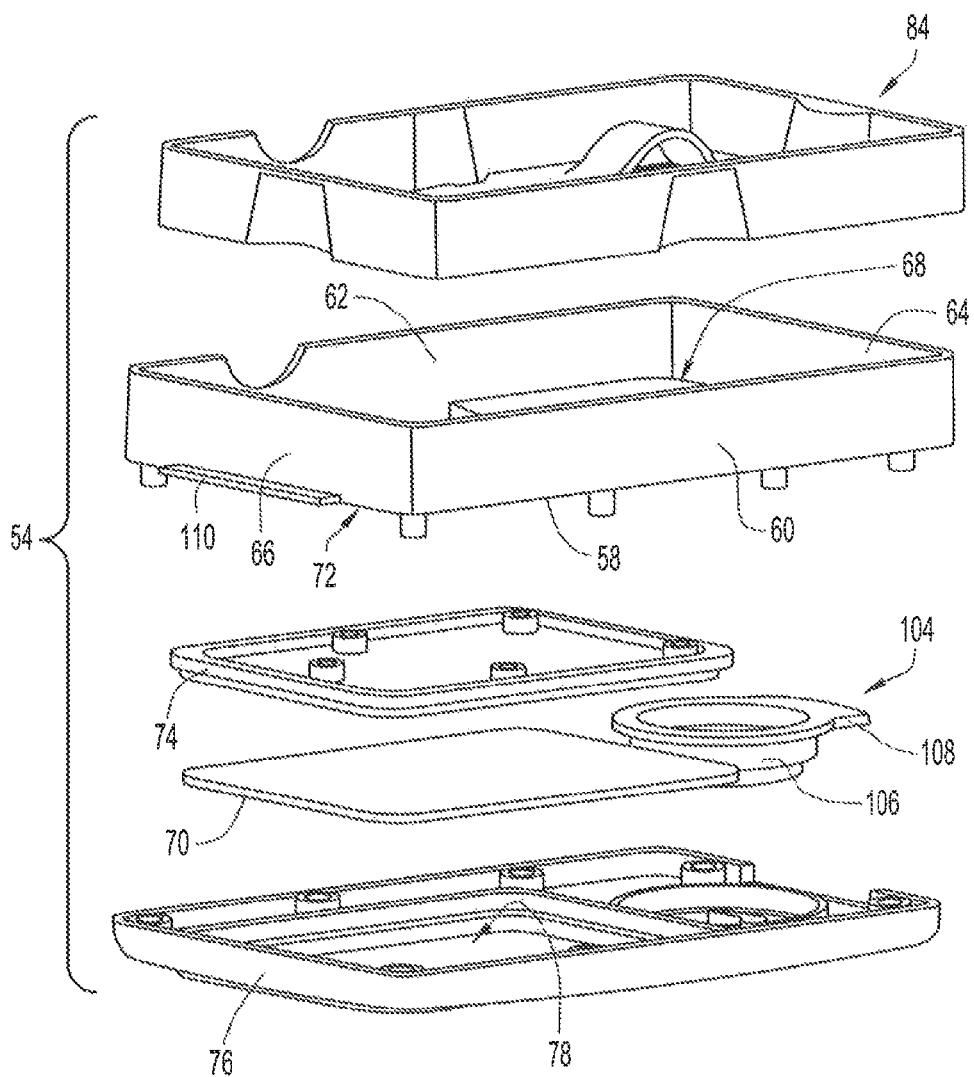
FIG. 5 illustrates an exploded perspective assembly view of the tray of FIG. 3.

Referring to FIG. 5, the tray 54 includes a base 58, opposing sidewalls 60, 62 extending upwardly from the base 58, and opposing end walls 64, 66 extending upwardly from the base 58. The base 58, sidewalls 60, 62 and end walls 64, 66 together define a recess 68 configured for receiving the electronic device 500. An entertainment element, such as a mirror 70, is coupled to an outer surface 72 of the base 58 of the tray 54 via a bracket or retainer 74. A cover 76 may be coupled to the outer surface 72 of the base 58, with the mirror 70 and retainer 74 sandwiched therebetween. When the protective case 10 is oriented so that the cover 76 of the tray 54 faces a user, the mirror 70 is visible to the user through a correspondingly configured opening 78 in the cover 76 (as shown in FIG. 2).

Figure 6:
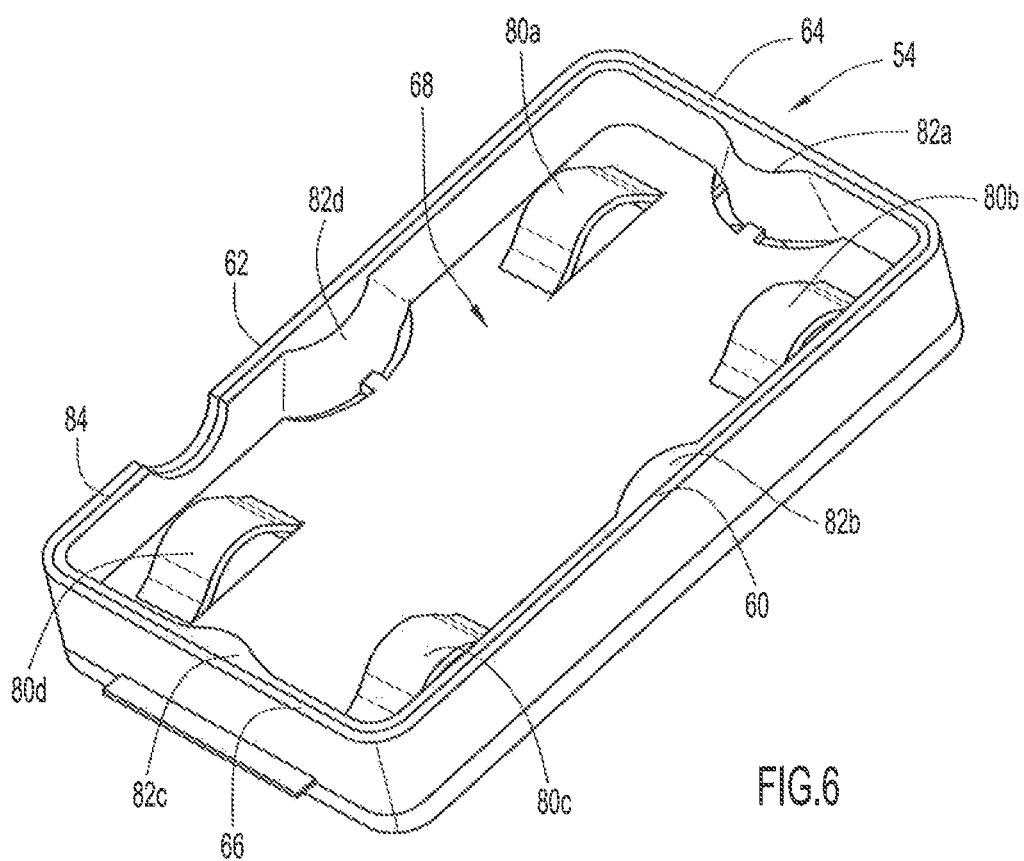
FIG. 6 illustrates a top perspective view of the tray of FIG. 3.

Referring to FIGS. 4 and 6, in one embodiment the tray 54 includes one or more resilient members 80a, 80b, 80c, 80d extending outwardly from the base 58 and into the recess 68. The resilient members 80a-80d extending from the base 58 are compressible against a back face of the portable electronic device 500, so that a front face of the portable electronic device 500 is biased away from the base 58 of the tray 54. The tray 54 may further include one or more resilient members 82a, 82b, 82c, 82d extending outwardly from the sidewalls 60, 62 and end walls 64, 66 and into the recess 68. The resilient members 82a-82d extending from the sidewalls 60, 62 and end walls 64, 66 are compressible against opposing sides and/or ends of the electronic device 500, so that the electronic device 500 is biased toward a centered position within the recess 68 of the tray 54.

With continued reference to FIG. 6, in one implementation, the tray 54 includes an overmold portion 84 which includes or defines the resilient members 80a-80d and 82a-82d. The overmold portion 84 substantially lines the recess 68 of the tray 54. The overmold portion 84 may be co-molded with other components of the tray 54, and, in the illustrated embodiment, is preferably not removable from the tray 54.

Referring to FIGS. 5, 7 and 8, the overmold portion 84 includes a base 86 and a sidewall 88 extending upwardly from a perimeter 90 of the base 86. The resilient members 80a-80d extending upwardly from the base 58 of the tray 54 are formed or defined by compressible ribs provided on the base 86 of the overmold portion 84. The resilient members 82a-82d extending outwardly from the sidewalls 60, 62 and end walls 64, 66 of the tray 54 are defined by compressible ribs on the sidewall 88 of the overmold portion 84. The compressible ribs or resilient members 80a-80d bias the electronic device 500 away from the base 58 of the tray 54, while the compressible ribs or resilient members 82a-82d bias the electronic device 500 toward a centered position within the recess 68 of the tray 54.

In one implementation, the overmold portion 84 is formed from a thermoplastic elastomer (TPE) material. The tray 54 may be formed from a more rigid polymer material, such as ABS. The tray 54 is sufficiently rigid so that the electronic device 500 is protected when disposed within the recess 68 of the tray 54. The overmold portion 84 is sufficiently flexible so that the resilient members 80a-80d and/or 82a-82d are permitted to compress inwardly toward the base 58, and sidewalls 60, 62 and/or end walls 64, 66 of the tray 54 to accommodate electronic devices 500 of various widths and/or lengths. However, the compressible ribs or resilient members 80a-80d and/or 82a-82d are sufficiently tensioned against the electronic device 500 so that the device 500 does not slide around within the recess 68 of the tray 54 when disposed therein. Thus, the collapsible ribs or resilient members 80a-80d and/or 82a-82d of the overmold portion 84 account for thickness, width, and/or length variations of different electronic devices 500.

Figure 9:
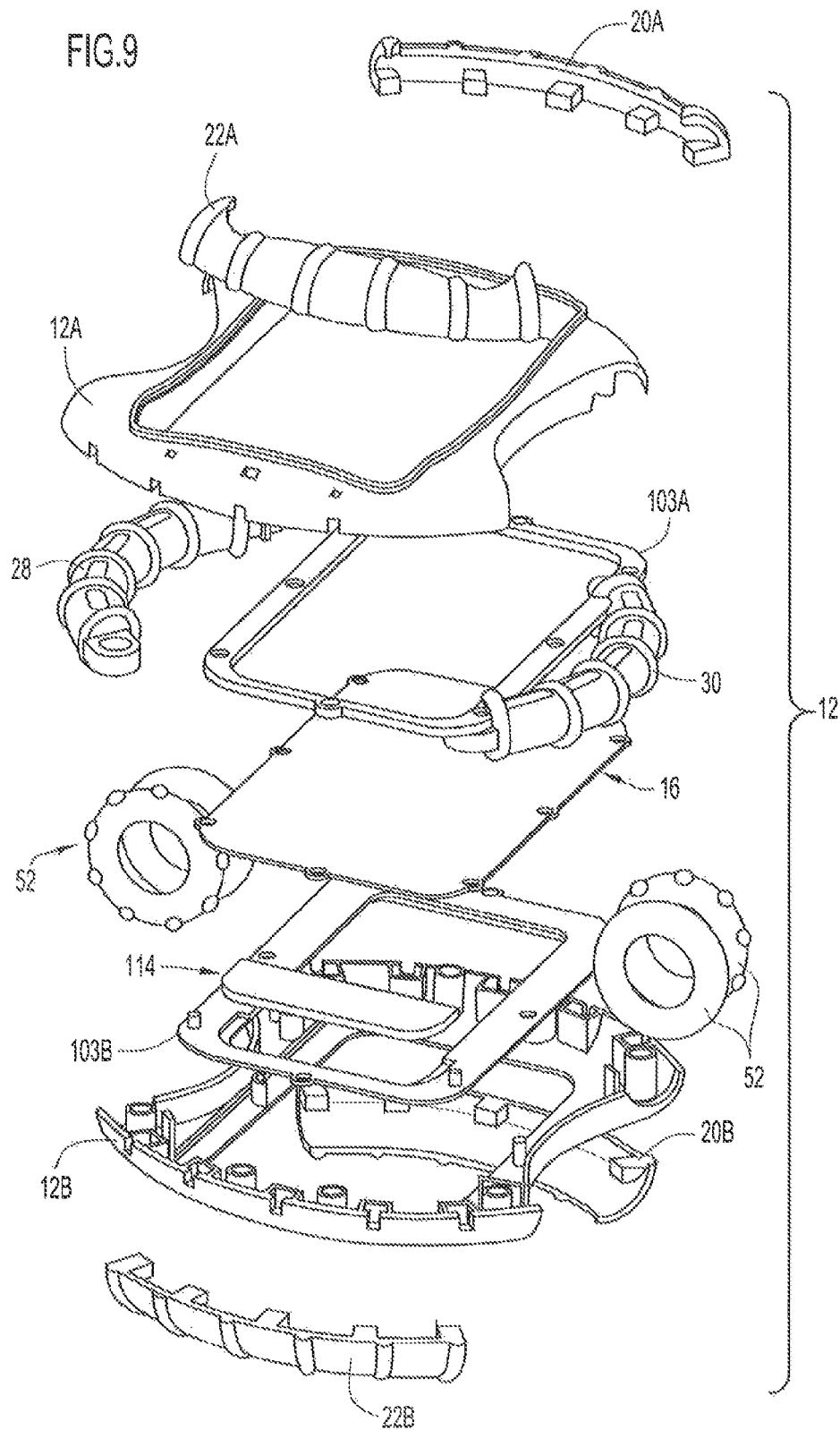
FIG. 9 illustrates an exploded perspective assembly view of the main body of FIG. 3.

Referring to FIGS. 3, 4 and 9, the main body 12 includes another recess 92 defined by a base 94, opposing side walls 96, 98 and opposing end walls 100, 102 that extend upwardly from the base 94. The recess 92 of the main body 12 is configured to receive the tray 54 (as shown in FIG. 3), thereby creating the cavity 56 (shown in FIG. 4) between the base 58 of the tray 54 and the base 94 of the main body 12. The electronic device 500 is releasably retainable within the cavity 56.

The base 94 of the main body 12 includes or defines the transparent planar portion 16 through which the display of the electronic device 500 is visible (as shown in FIG. 1). When the electronic device 500 is disposed within the cavity 56 between the base 58 of the tray 54 and the base 94 of the main body 12, a portion of the front face and the display of the electronic device 500 is visible and actuable through the transparent planar portion 16.

An assembly view of the main body 12 according to one embodiment is illustrated in FIG. 9. The main body 12 includes a first half shell 12A coupled to a second half shell 12B. The handles 28, 30 are coupled to the shells 12A, 12B of the main body 12. Each of the end portions 20, 22 may also be formed from mating half sections 20A, 20B and 22A, 22B, which are coupled to the main body 12. The transparent planar portion 16 and a plate 114 (discussed in further detail below) are sandwiched between screen retainer brackets 103A, 103B, which assembly is in turn sandwiched between the shells 12A, 12B. All components of the main body 12 may be fixedly secured together, such as by solvent bonding. Similarly, all components of the tray 54 may be fixedly secured together, such as by solvent bonding.

Referring again to FIGS. 3, 4, and 5, the tray 54 is releasably lockable to the main body 12 via a latch mechanism 104. In one embodiment, the latch mechanism 104 is coupled to the outer surface 72 of the base 58 of the tray 54 via the cover 76. The latch mechanism 104 includes a movable member 106 rotatable relative to the base 58 of the tray 54. The movable member 106 includes a flange 108 extending outwardly from the movable member 106, and receivable in a corresponding receiving portion, such as a slot (as shown in FIG. 4) disposed in the end wall 102 of the recess 92 of the main body 12. The flange 108 is movable between a locked position extending outwardly from the end wall 64 of the tray 54, and an unlocked position recessed from the end wall 64 of the tray 54. The opposing end wall 66 of the tray 54 includes a fixed flange 110 extending outwardly therefrom.

When inserting the tray 54 into the recess 92 of the main body 12 (as shown in FIG. 3), the fixed flange 110 is received in a receiving area, such as a slot (as shown in FIG. 4) disposed in the end wall 100 of the main body 12. The flange 108 of the latch mechanism 104 is disposed in its unlocked position, so that the tray 54 may then be pivoted downwardly until fully seated within the recess 92 of the main body 12. The flange 108 is then pivoted to its locked position within the slot in the other end wall 102 of the main body 12. In this way, the tray 54 may be releasably locked within the recess 92 of the main body 12. In one embodiment, the flange 108 is movable about 90° (e.g. a ¼ turn lock) from its unlocked position to its locked position. The movable member 106 includes a slot 112 for receiving a tool (e.g. a coin or screwdriver) to permit rotation thereof (and thus rotation of the flange 108).

It should be understood that alternative mechanisms may be employed for releasably coupling the tray 54 to the main body 12. For example, a lock mechanism 104A according to another embodiment is illustrated in FIG. 2. The lock mechanism 104A includes a latch movable between a locked position engaging a corresponding slot or receiving area in the main body 12, and an unlocked position disengaged from the slot or receiving area in the main body. The latch may be actuated via depression thereof, and biased toward its locked position via a resilient member (e.g., a spring). Alternatively, the tray 54 may include detents which are received in correspondingly configured indents in the main body 12. Alternatively, the tray 54 may be retained within the recess 92 of the main body 12 via friction fit.

Figure 10:
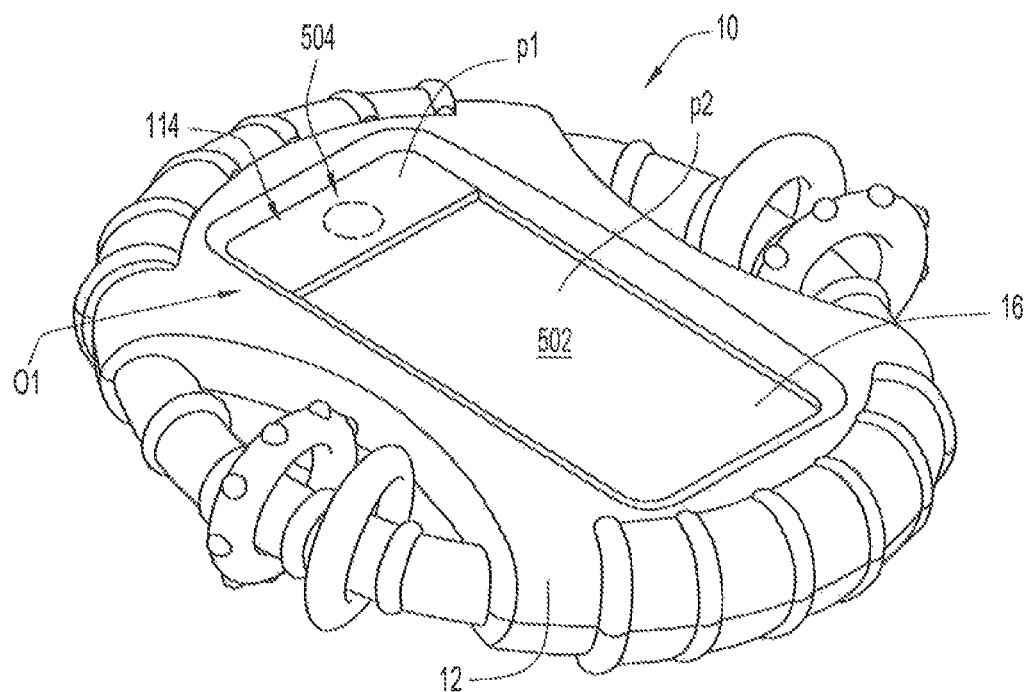
FIG. 10 illustrates a perspective view of the protective case of FIG. 1 showing the electronic device in a first orientation.
Figure 11:
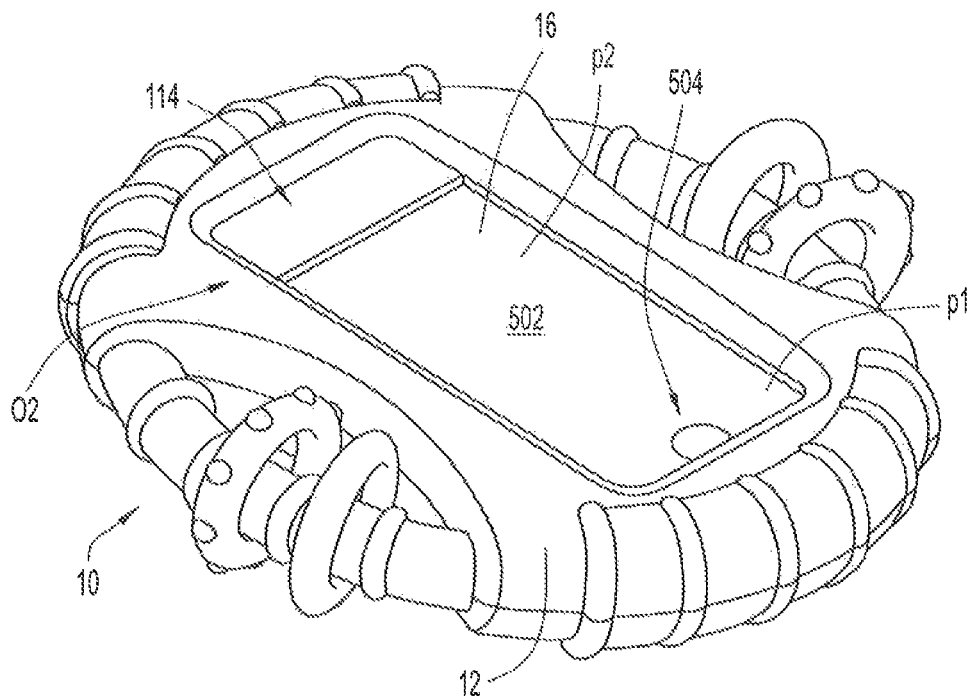
FIG. 11 illustrates a perspective view of the protective case of FIG. 10 showing the electronic device in a second orientation.

Referring to FIGS. 9, 10, and 11, the base 94 of the main body 12 includes a thickened portion or plate 114 adjacent or overlying a portion of the transparent planar portion 16. The plate 114 may be a separate component (as shown in FIG. 9), or defined by and integrally formed with the transparent planar portion 16. The plate 114 is configured to cover a portion of the front of the electronic device 500 or a portion of the display 502 of the electronic device 500. The portion of the electronic device 500 that is covered by the plate 114 is not operable (e.g., via touch or use of a stylus) through the thickened plate 114.

The electronic device 500 is disposable within the cavity 56 and between the base 58 of the tray 54 and the base 92 of the main body 12 in a first orientation O1 (shown in FIG. 10) with a portion p1 of the front of the electronic device 500 or the display 502 of the electronic device 500 blocked by the plate 114 and another portion p2 of the front of the electronic device 500 or the display 502 of the electronic device 500 visible and actuable through the transparent planar portion 16. The electronic device 500 is also disposable within the cavity 56 in a second orientation O2 (shown in FIG. 11) with the previously covered portion pl of the electronic device 500 now visible and actuable through the transparent planar portion 16.

With continued reference to FIGS. 10 and 11, the display 502 of the electronic device 500 may be a touch screen and/or include a "home" button 504 or other input area or button. The device 500 may be inserted into the cavity 56 in its first orientation O1 (shown in FIG. 10), so that the thickened plate 114 covers the home button 504 (shown in phantom in FIG. 10). Thus, the home button 504 is not actuable by the user (e.g., such as an infant or child) when the device 500 is disposed in its first orientation O1.

The device 500 may alternatively be inserted into the cavity 56 in its second orientation O2 (shown in FIG. 11), so that the device 500 is rotated 180° relative to its first orientation O1. The home button 504 is not covered by the plate 114 when the device 500 is in its second orientation O2. Thus, the home button 504 may be actuated by the user when the device 500 is disposed in its second orientation O2. In this way, access to the home button 504 (or other input button or portion of the face or display 502 of the device 500) may be selectively used or restricted by disposing the device 500 in either its first orientation O1 or its second orientation O2 within the cavity 56.

Figure 13:
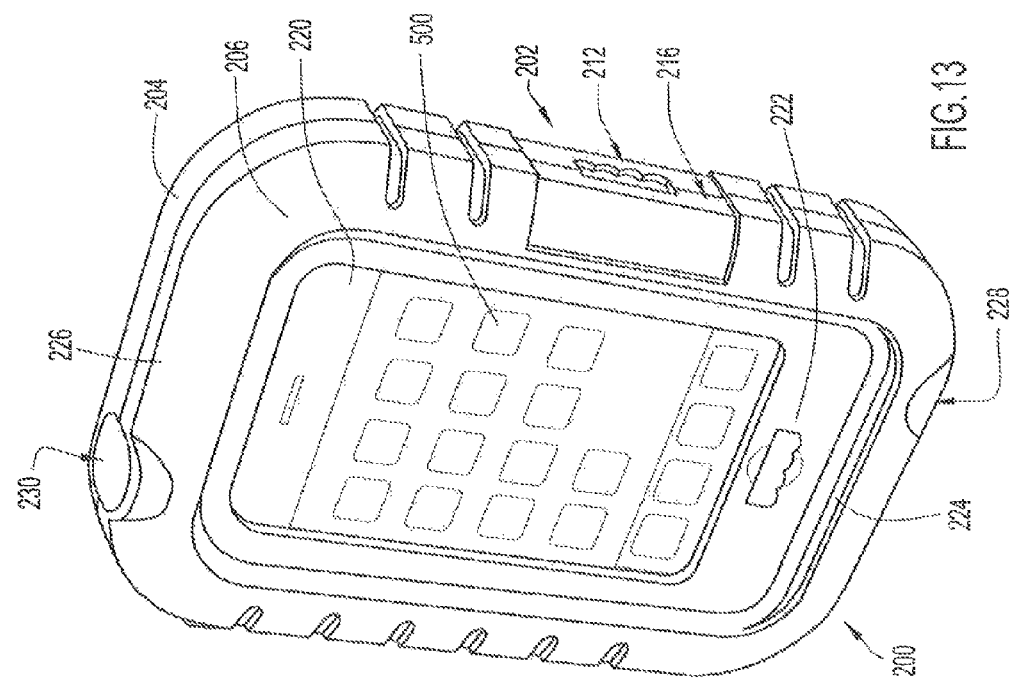
FIG. 13 illustrates a front perspective view of the protective case of FIG. 12.
Figure 12:
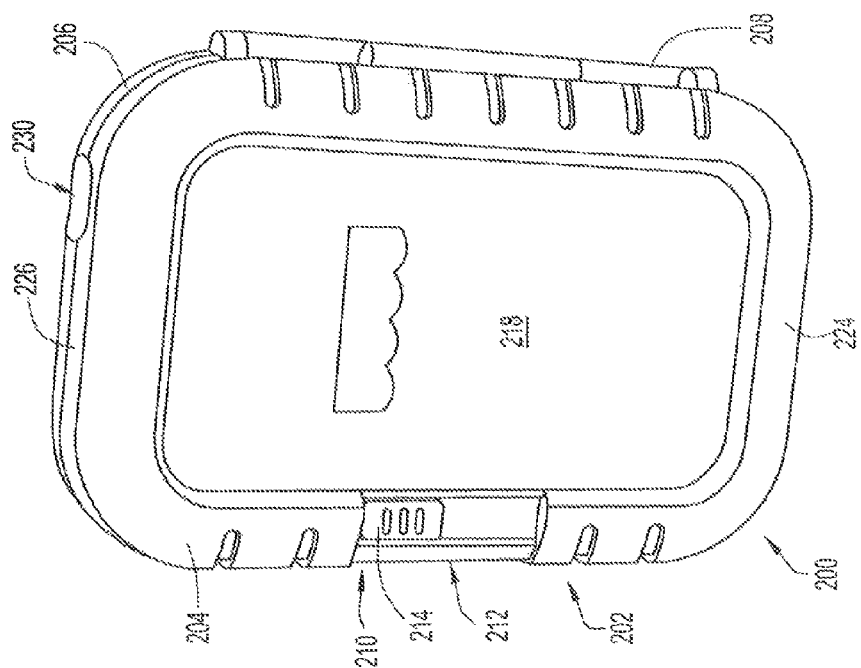
FIG. 12 illustrates a rear perspective view of a protective case according to another embodiment of the present invention.

A protective case 200 according to another embodiment of the present invention is illustrated in FIGS. 12 and 13. The protective case 200 includes a main body 202 having a rear shell 204 pivotally connected to a front shell 206 via a hinge mechanism 208. A cavity (not shown) is disposed between the rear and front shells 204, 206, which is configured to receive a portable electronic device 500.

Referring to FIG. 12, the rear shell 204 includes a lock mechanism 210 disposed along an edge 212 thereof opposite to the hinge mechanism 208. The lock mechanism 210 includes a latch 214 slidably movable between a closed position locking the edge 212 of the rear shell 204 to a corresponding edge 216 of the front shell 206 restricting access to the cavity, and an open position unlocking the edge 212 of the rear shell 204 to the edge 216 of the front shell 206 so that access to the cavity is permitted. Thus, the lock mechanism 210 allows the rear shell 204 to be pivoted open so that the hand-held electronic device 500 may be placed (face-down) into the cavity. The rear shell 204 is then pivoted to its closed position over the rear face of the hand-held electronic device 500, and locked in its closed position via the latch 214.

An entertainment element, such as a minor, may be coupled to an exterior surface 218 of the rear shell 204, so that a user can view himself in the mirror. In other embodiments, alternative entertainment elements may be provided on the rear shell 204. Alternatively, no additional entertainment element(s) is provided on the exterior surface 218 of the rear shell 204.

Referring to FIG. 13, the front shell 206 includes a transparent planar portion 220 through which at least a portion of the front surface and display of the electronic device 500 is visible when disposed within the cavity. The electronic device 500 may include a touch screen, which is actuable through the transparent planar portion 220. The front shell 206 also includes a thickened portion 222 or plate adjacent the transparent planar portion 220 and proximate to an end 224 of the main body 202. The thickened portion 222 covers or blocks a portion of the display and/or front face of the electronic device 500. The portion of the display and/or any input buttons on the front face of the device 500 which are covered by the thickened portion 222 are not actuable through the thickened portion 222.

Referring to FIG. 14, the electronic device 500 may be disposed within the cavity of the main body 202 in an orientation O3 with the home button 504 (or other input button or area) accessible through the transparent planar portion 220. The electronic device 500 may alternatively be disposed within the cavity in another orientation O4, so that the device 500 is rotated 180° relative to orientation O3. In orientation O4, the home button 504 (or other input button or area) is blocked by the thickened portion 222 and not actuable therethrough. Thus, access to the home button 504 (or other input button or portion of the screen 502) may be selectively permitted by disposing the device 500 in orientation O3, or restricted by disposing the device 500 in orientation O4 within the cavity of the main body 202.

Opposing ends 224, 226 of the main body 202 may each include an opening 228, 230, respectively, which aligns with a headphone jack on the device 500. Thus, the headphone jack is accessible when the device 500 is in either orientation O3 or orientation O4.

The disclosed protective case 10, 200 of the present invention permits the user (e.g. a parent or care giver) to selectively block a portion of the display and/or front face of the electronic device 500 with the thickened portion or plate by selecting the orientation in which the electronic device 500 is disposed within the case 10, 200.

Although the thickened portion 222 and/or plate 114 is illustrated as being disposed proximate an end of the transparent planar portion 220, 16, it should be understood that such a thickened portion and/or plate may be disposed in alternative locations relative to the transparent planar portion 220, 16. For example, a thickened portion or plate may be located so that other or additional areas of the display and/or front face of the electronic device 500 are not actuable.

Moreover, the plate 114 may be movable to a selected area of the base 94 of the main body 12, so that a selected portion of the transparent planar portion 16 may be covered and rendered not actuable. For example, the base 94 may include defined receiving areas or zones in which the plate 114 is selectively receivable.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. For example, although the illustrated embodiments are shown with an iPhone® or an iPod Touch® device, the case of the present invention could be used with any portable electronic device, including, but not limited to cellular phones, media players, PDAs, and portable or tablet computers. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A protective case for a portable electronic device, comprising:
   a tray including a base and sidewall defining a first recess configured for receiving the portable electronic device;
   a main body including a base and sidewalls defining a second recess configured for receiving said tray, said base of said main body including a transparent planar portion, the portable electronic device disposable between said base of said tray and said transparent planar portion of said main body so that at least a portion of a display of the portable electronic device is visible through said transparent planar portion
   handles extending outwardly from and coupled to said main body; and
   an entertainment element coupled to at least one of said handles.

2. The protective case of claim 1, further comprising a resilient member extending outwardly from and coupled to said base of said tray, said resilient member compressible against the portable electronic device so that the portable electronic device is biased away from said base of said tray and toward said transparent planar portion.

3. The protective case of claim 1, further comprising a resilient member extending outwardly from and coupled to said sidewall of said tray, said resilient member compressible against the portable electronic device so that the portable electronic device is biased away from said sidewall of said tray.

4. The protective case of claim 1, further comprising a plate disposed against or defined by a portion of said base of said main body, said plate covering a portion of the display of the portable electronic device.

5. The protective case of claim 4, wherein the portable electronic device is disposable between said base of said tray and said transparent planar portion in a first orientation wherein said portion of the display of the portable electronic device is visible through said transparent planar portion, and disposable between said base of said tray and said transparent planar portion in a second orientation wherein said portion of the display of the portable electronic device is blocked by said plate.

6. The protective case of claim 1, wherein each of said handles has an arcuate configuration.

7. The protective case of claim 1, wherein said entertainment element includes a plurality of rings movable along the corresponding at least one of said handles.

8. The protective case of claim 1, further comprising an entertainment member coupled to an outer surface of said base of said tray.

9. The protective case of claim 8, wherein said entertainment member is a mirror.

10. The protective case of claim 1, wherein said tray includes a latch mechanism releasably lockable to a receiving portion of said main body so that said tray is releasably lockable to said main body.

11. The protective case of claim 1, further comprising an overmold portion coupled to said tray and substantially lining said first recess, said overmold portion including a plurality of outwardly extending compressible ribs configured to bias the portable electronic device away from said base and said sidewall of said tray.

12. A protective case for an electronic portable device, comprising:
    a main body portion including a base and sidewalls defining a first recess configured for releasably receiving a portable electronic device, the main body portion having a first side and a second side;
    a plate disposed against or defined by a portion of said base of said main body, said plate covering a portion of a display of the portable electronic device, the covered portion of the display not actuable through said plate;
    a first handle coupled to and extending outwardly from the first side of said main body portion;
    a second handle coupled to and extending outwardly from the second side of said main body portion; and
    at least one entertainment element coupled to at least one of said first and second handles.

13. The protective case of claim 12, further comprising:
    a tray including a base and sidewall defining a second recess configured for receiving the portable electronic device, said tray receivable in said first recess so that the portable electronic device is disposable between said base of said main body and said base of said tray.

14. The protective case of claim 13, wherein said first and second handles have a generally circular configuration in plan view.

15. The protective case of claim 14, wherein said at least one entertainment element is movable along said at least one of said first and second handles between opposing end portions thereof.

16. The protective case of claim 15, wherein said base includes a transparent planar portion, at least a portion of a touch screen of the portable electronic device disposed against and actuable through said transparent planar portion when the portable electronic device is disposed in said first recess.

17. A protective case for a portable electronic device with a front surface including a display and an input device, the case comprising:
    a tray including a base and sidewall defining a first recess configured for receiving the portable electronic device;
    a main body including a base and sidewalls defining a second recess configured for receiving said tray, said base of said main body including an opening and a transparent planar portion covering the opening, the portable electronic device disposable between said base of said tray and said transparent planar portion of said main body so that at least a portion of the front surface of the portable electronic device including the input device is visible and actuable through said transparent planar portion; and
    a plate disposed against the transparent planar portion of the base of the main body, wherein the portable electronic device is disposable between said base of said tray and said transparent planar portion in a first orientation wherein the portion of the front surface of the portable electronic device including the input device is visible and actuable through said transparent planar portion, and disposable between said base of said tray and said transparent planar portion in a second orientation wherein the portion of the front surface of the portable electronic including the input device is blocked by said plate.

18. The protective case of claim 17, wherein at least a portion of a touch screen of the portable electronic device disposed against and actuable through said transparent planar portion when the portable electronic device is disposed in both the first and second orientations.

19. The protective case of claim 18, wherein the main body included handles extending outwardly from and coupled to said main body.

20. The protective case of claim 19, wherein an entertainment element is coupled to at least one of said handles.

\* \* \* \* \*

UNITED STATES PATENT AND TRADEMARK OFFICE
CERTIFICATE OF CORRECTION

| | |
|---|---|
| PATENT NO. | : 8,910,787 B2 |
| APPLICATION NO. | : 13/351811 |
| DATED | : December 16, 2014 |
| INVENTOR(S) | : Daniel J. Damon et al. |

It is certified that error appears in the above-identified patent and that said Letters Patent is hereby corrected as shown below:

In the Specification,

Column 7, line 19, change "pl" to --p1--; and

Column 7, line 64, change "minor" to --mirror--.

Signed and Sealed this
Thirtieth Day of June, 2015

Michelle K. Lee
*Director of the United States Patent and Trademark Office*